(12) United States Patent
Chen (10) Patent No.: US 12,036,992 B2
(45) Date of Patent: Jul. 16, 2024

(54) LANE CHANGE PLANNING METHOD AND VEHICLE-MOUNTED DEVICE

(71) Applicant: Mobile Drive Technology Co., Ltd., New Taipei (TW)

(72) Inventor: Wei-Jie Chen, New Taipei (TW)

(73) Assignee: Mobile Drive Netherlands B.V., Amsterdam (NL)

( * ) Notice: Subject to any disclaimer, the term of this patent is extended or adjusted under 35 U.S.C. 154(b) by 354 days.

(21) Appl. No.: 17/372,746

(22) Filed: Jul. 12, 2021

(65) Prior Publication Data

US 2022/0017094 A1  Jan. 20, 2022

(30) Foreign Application Priority Data

Jul. 15, 2020 (CN) .......................... 202010678155.6

(51) Int. Cl.
*B60W 30/095* (2012.01)
*B60W 30/18* (2012.01)
*B60W 40/02* (2006.01)

(52) U.S. Cl.
CPC . *B60W 30/18163* (2013.01); *B60W 2520/105* (2013.01); *B60W 2520/125* (2013.01); *B60W 2552/10* (2020.02); *B60W 2554/4041* (2020.02); *B60W 2554/801* (2020.02); *B60W 2554/802* (2020.02)

(58) Field of Classification Search
CPC ..... B60W 30/18163; B60W 2520/105; B60W 2520/125; B60W 2552/10; B60W 2554/4041; B60W 2554/801; B60W 2554/802; B60W 30/0953; B60W 30/0956; B60W 2552/53; B60W 2554/80; B60W 40/02
USPC .......................................... 701/25
See application file for complete search history.

(56) References Cited

U.S. PATENT DOCUMENTS

| | | | |
|---|---|---|---|
| 10,259,459 B2 | 4/2019 | Takae et al. | |
| 11,541,910 B1* | 1/2023 | Ganguli | B60W 30/18163 |
| 2018/0057002 A1* | 3/2018 | Lee | B60W 60/0015 |
| 2019/0061766 A1* | 2/2019 | Nishiguchi | B60W 10/06 |
| 2020/0262448 A1 | 8/2020 | Li et al. | |

(Continued)

FOREIGN PATENT DOCUMENTS

| | | |
|---|---|---|
| CN | 107851389 | 3/2018 |
| CN | 108995644 | 12/2018 |

(Continued)

*Primary Examiner* — Abby Y Lin
*Assistant Examiner* — Hossam M Abd El Latif
(74) *Attorney, Agent, or Firm* — ScienBiziP, P.C.

(57) ABSTRACT

A lane change planning method plans a first lane change path based on a lane where a vehicle is currently driving and an adjacent lane and controls the vehicle to drive based on the first lane change path. When the vehicle drives to a first target position, a first target object such as another vehicle is detected. Wherein the first target position is determined by the first lane change path, and a dividing line between the lane where the vehicle is currently driving and the adjacent lane. The vehicle is controlled to drive according to the first lane change path, when the first target object is not detected within a preset distance. The present disclosure also provides a vehicle-mounted device. The present disclosure adds to safer road driving on busy roads.

18 Claims, 4 Drawing Sheets

(56) References Cited

U.S. PATENT DOCUMENTS

2021/0323557 A1* 10/2021 Yen ..................... G06V 20/588
2021/0387634 A1* 12/2021 Luna Arriaga . B60W 30/18163
2023/0021000 A1*  1/2023 Okonogi ............... B60W 30/16

FOREIGN PATENT DOCUMENTS

| CN | 109739246 | 5/2019 |
| CN | 110103967 | 8/2019 |
| CN | 110667581 | 1/2020 |
| CN | 110949378 | 4/2020 |

* cited by examiner

LANE CHANGE PLANNING METHOD AND VEHICLE-MOUNTED DEVICE

CROSS-REFERENCE TO RELATED APPLICATIONS

This application claims priority to Chinese Patent Application No. 202010678155.6 filed on Jul. 15, 2020, the contents of which are incorporated by reference herein.

FIELD

The present disclosure relates to a technical field of road automobile auxiliary safety management, specifically to a lane change planning method and a vehicle-mounted device.

BACKGROUND

Traffic is becoming busier with a greater density of vehicles. There is often a need to change lanes during driving. However, another vehicles in the traffic where the vehicle is located may make lane-changes more risky.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
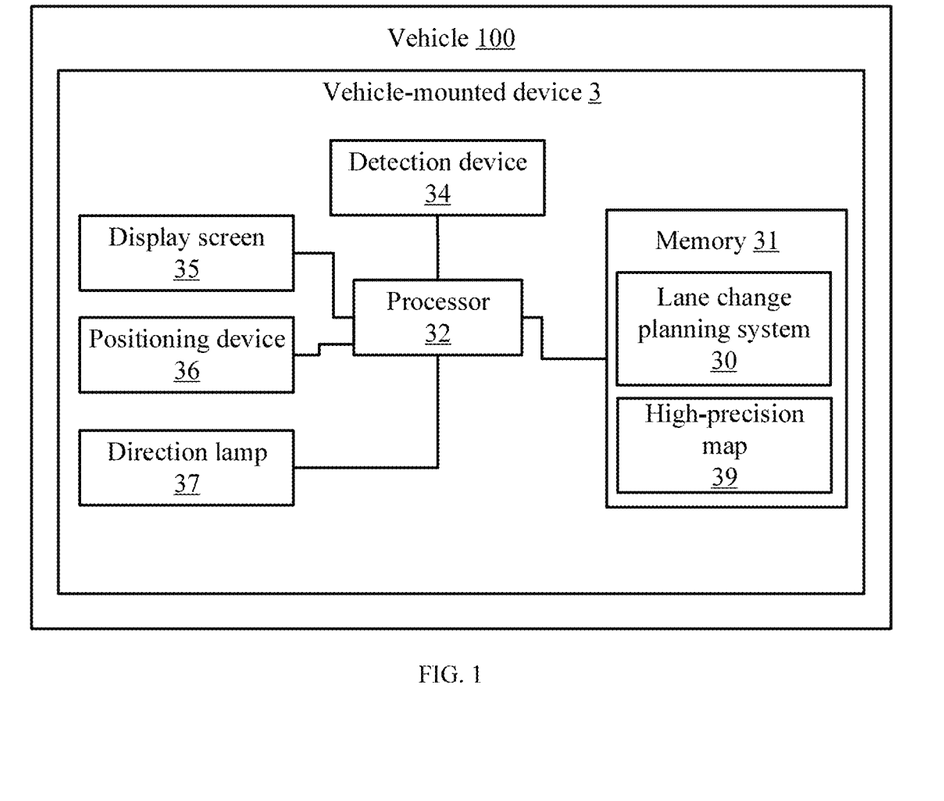
FIG. 1 shows a schematic structural diagram of a vehicle-mounted device provided in an embodiment of the present disclosure.

Refer to FIG. 1, a schematic structural diagram of a vehicle-mounted device is provided in an embodiment of the present disclosure.

In one embodiment, a vehicle-mounted device 3 is installed on a vehicle 100. The vehicle-mounted device 3 may also be called an vehicle-mounted computer, and includes a memory 31, at least one processor 32, one or more detection devices 34, a display screen 35, a positioning device 36, and a direction lamp 37 that are electrically connected to each other.

Those skilled in the art will understand that the vehicle-mounted device 3 shown in FIG. 1 does not constitute a limitation of the embodiment of the present disclosure. An vehicle-mounted device 3 may include more or fewer components than shown in the figures or may combine some components or have different components.

It should be noted that the vehicle-mounted device 3 is only an example, and other existing or future vehicle-mounted devices that can be adapted to the present disclosure are to be included in the scope of protection of the present disclosure and included here by reference.

The memory 31 can be configured to store the computer-readable instructions and/or modules/units. The processor 32 may run or execute the computer-readable instructions and/or modules/units stored in the memory 31 and may call up data stored in the memory 31 to implement various functions of the vehicle-mounted device 3. The memory 31 mainly includes a storage program area and a storage data area. The storage program area may store an operating system, and an application program required for at least one function (such as a sound playback function, an image playback function, etc.), etc. The storage data area may store data (such as audio data, phone book data, etc.) created according to the use of the vehicle-mounted device 3. In addition, the memory 31 may include random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

The at least one processor 32 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 32 can be a microprocessor or any conventional processor. The processor 32 is a control center of the vehicle-mounted device 3 and connects various parts of the entire vehicle-mounted device 3 by using various interfaces and lines.

When the modules/units integrated into the vehicle-mounted device 3 are implemented in the form of standalone or independent software functional units, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

The detection device 34 may be an ultrasonic sensor, a radar, a camera, or a combination of two or more of them. The one or more detection devices 34 may be installed on the vehicle 100, as long as the vehicle-mounted device 3 can detect a target object by using the one or more detection devices 34.

The target object refer to another vehicle that is driving in an adjacent lane and behind or beside the vehicle 100, and a preset distance (for example, 10 meters or other distance values) from the vehicle 100. The target object may also refer to that is driving in a lane where the vehicle 100 is currently driving and behind the vehicle 100, and at the preset distance from the vehicle 100.

The adjacent lane refers to a left lane adjacent to the lane in which the vehicle 100 is currently driving (hereinafter referred to as "left adjacent lane") or a right lane adjacent to the lane where the vehicle 100 is currently driving (hereinafter referred to as "right adjacent lane").

The display screen 35 may be a touch display screen for displaying various data of the vehicle-mounted device 3, for example, a user interface for displaying a high-precision map 39. In some embodiments, the high-precision map 39 may be a Baidu high-precision map or other map such as a Google high-precision map.

The high-precision map 39 indicates characteristics of each lane of each road, a center line of each lane, a dividing line between two lanes, and a style of the dividing line.

It should be noted that the style of the dividing line between the two lanes may be used to indicate whether a vehicle can change lanes between the two lanes. For example, when a style of the dividing line between the two lanes is a white dashed line, the vehicle can change lanes between the two lanes. For another example, when a style of the dividing line between the two lanes is a white solid line, the vehicle cannot change lanes between the two lanes.

In other embodiments, the vehicle-mounted device 3 can also photograph a boundary line between the lane where the vehicle 100 is currently driving and the adjacent lane by using the one or more detection devices 34.

In one embodiment, the positioning device 36 may be used to locate a current position of the vehicle 100 (such as latitude and longitude information). In one embodiment, the positioning device 36 may be one or a combination of a global positioning system (GPS), an assisted global positioning system (AGPS), or a BeiDou Navigation Satellite System (BDS), or a global navigation satellite system (GLONASS).

The direction lamp 37 is used as an indicator light that is turned on when the vehicle 100 is turning to prompt attention of another vehicle and pedestrians in a front, a rear, a left, and a right of the vehicle 100. The direction light 37 includes a left turn signal and a right turn signal (not shown in the figures).

Figure 2:
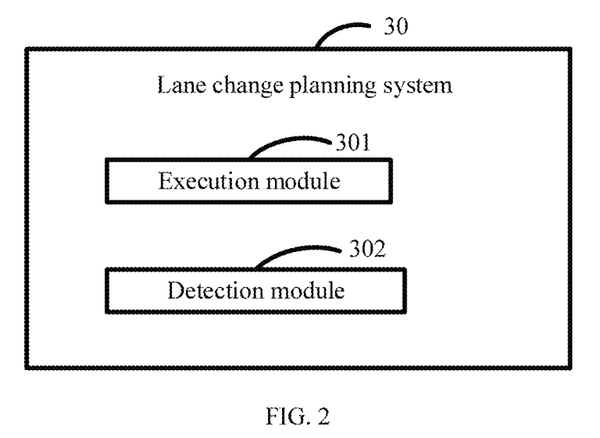
FIG. 2 shows a functional block diagram of a lane change planning system provided in an embodiment of the present disclosure.

FIG. 2 shows a schematic structural diagram of an vehicle-mounted device provided in the embodiment of the present disclosure.

In some embodiments, a lane change planning system 30 can include one or more function modules consisting of program code segments. The program code of each program code segments in a lane change planning system 30 can be stored in a memory (for example, the memory 31 of the vehicle-mounted device 3) and executed by at least one processor (for example, the processor 32 of the vehicle-mounted device 3) to realize a function of planning lane change paths.

As shown in FIG. 2, the lane change planning system 30 can include: an execution module 301, and a detection module 302. A module as referred to in the present disclosure refers to a series of computer-readable instruction segments that can be executed by at least one processor and that are capable of performing fixed functions, which are stored in a memory. In some embodiment, the functions of each module will be detailed.

The above-mentioned integrated unit implemented in a form of software functional modules can be stored in a non-transitory readable storage medium. The above software function modules are stored in a storage medium and includes several instructions for causing an electronic device (which can be a personal computer, a dual-screen device, or a network device) or a processor to execute the method described in various embodiments in the present disclosure.

Figure 3:
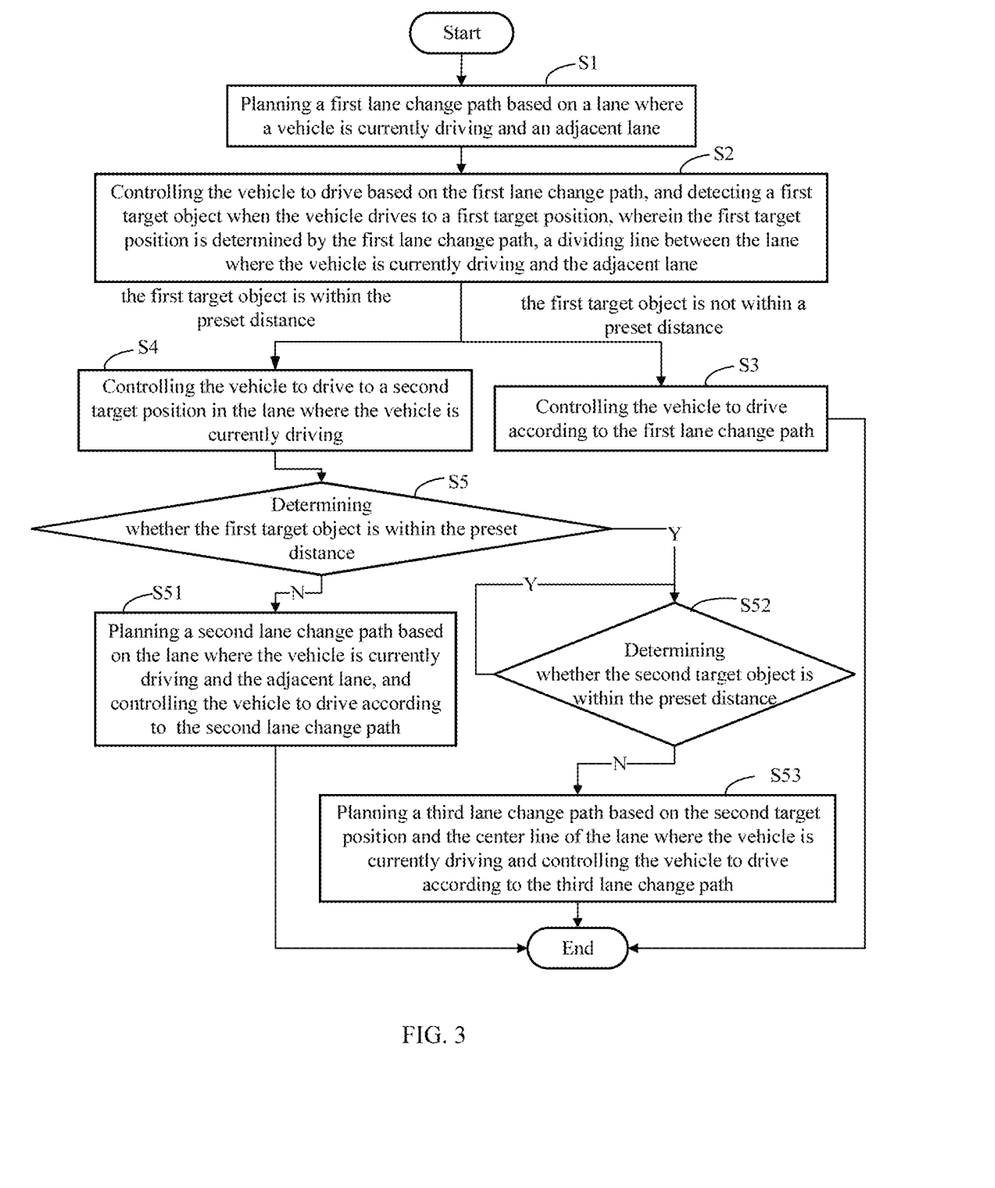
FIG. 3 shows a flowchart of a lane change planning method provided in an embodiment of the present disclosure.

FIG. 3 is a flowchart of a lane change planning method in an embodiment of the present disclosure. The lane change planning method is applied to the vehicle-mounted device 3. According to different needs, the order of the steps in the flowchart can be changed, and some can be omitted.

In block S1, an execution module 301 plans a first lane change path based on a lane where the vehicle 100 is currently driving and an adjacent lane.

In this embodiment, the adjacent lane is a left adjacent lane or a right adjacent lane of the lane where the vehicle 100 is currently driving.

In this embodiment, the execution module 301 can obtain the lane where the vehicle 100 is currently driving, a center line of the lane where the vehicle 100 is currently driving, the adjacent lane, information of dividing line between the lane where the vehicle 100 is currently driving and the adjacent lane, for example, a style of the dividing line, from a high-precision map 39.

In one embodiment, the execution module 301 plans the first lane change path based on the lane where the vehicle 100 is currently driving and the adjacent lane, when detecting a designated signal and determining that the vehicle 100 can safely change the lane to the adjacent lane.

In another embodiment, the execution module 301 may plan the first lane change path based on the lane where the vehicle 100 is currently driving and the adjacent lane, when the vehicle 100 drives to the center line of the lane where the vehicle 100 is currently driving and detects the designated signal and determines that the vehicle 100 can change the lane to the adjacent lane.

In one embodiment, the method for the execution module 301 to determine the center line of the vehicle 100 driving to the current lane includes: using a positioning device 36 to locate the lane where the vehicle 100 is currently driving on the high-precision map 39; determining whether the vehicle 100 is driving on the center line of the lane where the vehicle 100 is currently driving from the high-precision map 39.

In one embodiment, the designated signal is a turn signal of a direction lamp 37, and the turn signal corresponds to the adjacent lane. The turn signal corresponding to the adjacent lane means that when the turn signal is a left turn signal, the adjacent lane refers to a left adjacent lane; when the turn signal is a right turn signal, the adjacent lane refers to a right adjacent lane.

In one embodiment, the execution module 301 may determine whether the vehicle 100 can be changed to the adjacent lane according to the style of the dividing line between the lane where the vehicle 100 is currently driving and the adjacent lane.

Specifically, when the style of the boundary line between the lane where the vehicle 100 is currently driving and the adjacent lane is a white dashed line, the execution module 301 determines that the vehicle 100 can be changed to the adjacent lane. When the style of the dividing line between the lane where the vehicle 100 is currently driving and the adjacent lane is a white solid line, the execution module 301 determines that the vehicle 100 cannot change to the adjacent lane.

In one embodiment, the execution module 301 may use the positioning device 36 and the high-precision map 39 to obtain the style of the dividing line between the lane where the vehicle 100 is currently driving and the adjacent lane.

Specifically, the method of obtaining the style of the dividing line between the lane where the vehicle 100 is currently driving and the adjacent lane includes: using the positioning device 36 to locate the lane where the vehicle 100 is currently driving on a preset high-precision map 39; and obtaining, from the preset high-precision map 39, the style of the dividing line between the lane where the vehicle 100 is currently driving and the adjacent lane.

As described above, the high-precision map 39 indicates each lane of each road, the center line of each lane, the center line of a dividing line between two lanes, and the style of the dividing line.

In other embodiments, the method of obtaining the style of the dividing line between the lane where the vehicle 100 is currently driving and the adjacent lane includes: using a detection device 34 to capture an image, and the image includes the dividing line between the lane where the vehicle 100 is currently driving and the adjacent lane; and applying an image recognition algorithm to recognize the style of the dividing line between the lane where the vehicle 100 is currently driving and the adjacent lane from the image.

The image recognition algorithm may be a template matching method. For example, the execution module 301 may use dividing line of each of a plurality of styles (such as white solid lines, yellow solid lines, white dashed lines, and yellow dashed lines) as a template, and match each template with the captured image. When the dividing line of a certain style matches the dividing line in the captured image, it is determined that the style of the dividing line in the captured image is the certain style. It should be noted that the certain style is any one of the plurality of styles.

In one embodiment, the planning of the first lane change path based on the lane where the vehicle 100 is currently driving and the adjacent lane includes: planning the first lane change based on the center line of the lane where the vehicle 100 is currently driving and a center line of the adjacent lane.

In one embodiment, the first lane change path is a function of a formula which includes a time and an acceleration rate, wherein the time is a period when the vehicle performs a lane change, and the acceleration rate is a lateral acceleration rate at which the vehicle performs the lane change.

Specifically, the functional formula of the first lane change path is $y_{TAP}(t)$, where:

$$y_{TAP}(t) = \begin{cases} \frac{1}{6}J_{y,d}t^3 & 0 \leq t \leq t_1 \\ y_1 + v_1(t-t_1) + \frac{1}{2}a_{y,d}(t-t_1)^2 & t_1 < t \leq t_2 \\ y_2 + v_2(t-t_2) + \frac{1}{2}a_{y,d}(t-t_2)^2 - \frac{1}{6}J_{y,d}(t-t_2)^3 & t_2 < t \leq t_3 \\ y_3 + v_3(t-t_3) + \frac{1}{2}a_{y,d}(t-t_3)^2 - \frac{1}{6}J_{y,d}(t-t_3)^3 & t_3 < t \leq t_4 \\ y_4 + v_4(t-t_4) - \frac{1}{2}a_{y,d}(t-t_4)^2 & t_4 < t \leq t_5 \\ y_5 + v_5(t-t_5) - \frac{1}{6}J_{y,d}(t-t_5)^3 & t_5 < t \leq t_6 \\ y_d & t > t_6 \end{cases}$$

Wherein, $v_i = v_{y,TAP}(t_i)$, $y_i = y_{TAP}(t_i)$, $i \in [0,6]$.

Wherein, $a_{y,d}$ represents the lateral acceleration rate when changing lanes, $J_{y,d}$ represents a lateral jerking degree when changing lanes; $v_i$ represents a required driving lateral speed during a time period $t_i$; $y_i$ represents a lateral displacement required for the corresponding time period $t_i$; $y_d$ is a lateral displacement required to complete the lane change.

Figure 4:
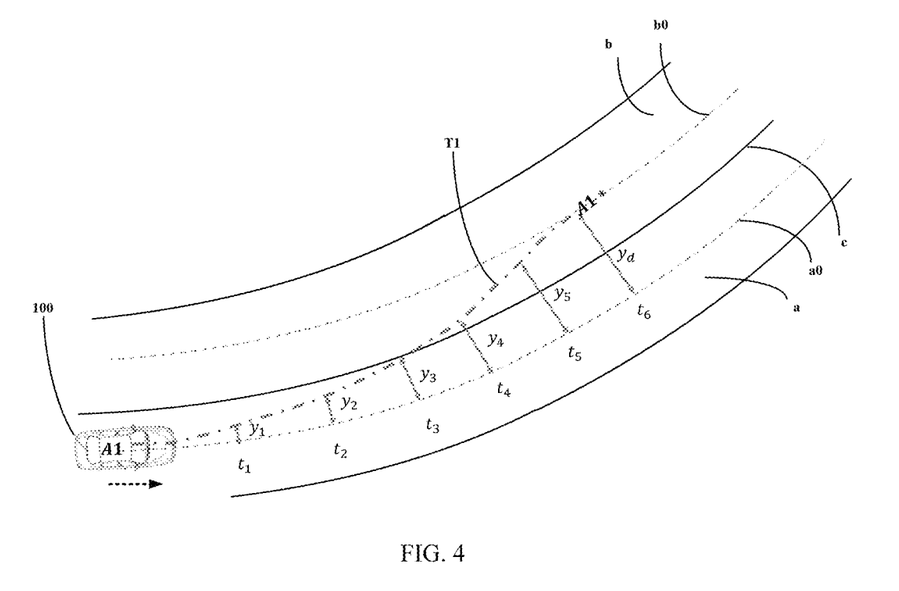
FIG. 4 illustrates planning a path to change lane in an embodiment of the present disclosure.

For example, referring to FIG. 4, when the vehicle 100 drives to a position A1 of a lane a, the left turn signal of the turn signal 37 is detected, and the position A1 is located on a center line a0 of the lane a, and the dividing line c between the lane b and the lane b is a white dashed line, then the execution module 301 plans the first lane change path based on the position A1 of the center line a0 of the lane a where the vehicle 100 is currently driving and the center line b0 of the adjacent lane b. The variable y1 represents the lateral displacement required by the vehicle 100 after driving from the position A1 for t1; y2 represents the lateral displacement required by the vehicle 100 after driving from the position A1 for t2; y3 represents the lateral displacement required by the vehicle 100 after driving from the position A1 for t3; y4 represents the lateral displacement required after the vehicle 100 has traveled from the position A1 for t4; y5 represents the lateral displacement required by the vehicle 100 after traveling from the position A1 for t5. yd (that is, y6) represents the lateral displacement required after the vehicle 100 drives from the position A1 for t6, and then to the position A1* on the center line b0 of the position lane b.

It should be noted that the execution module 301 can also use any other existing lane change control (LCC) to plan the first lane change path.

In block S2, the execution module 301 controls the vehicle 100 to drive based on the first lane change path. When the vehicle 100 drives to a first target position, the detection module 302 detects a first target object, wherein the first target position is determined by the first lane change path, the dividing line between the lane where the vehicle 100 is currently driving and the adjacent lane.

In one embodiment, when the first target object is not detected within a preset distance (for example, 10 meters or other distance value), step S3 is executed. When the first target object is detected within the preset distance, step S4 is executed.

In an embodiment, the first target position is any position within a target range, the target range is a range of an imaginary circle, a center of the imaginary circle is a point of intersection of the first lane change path and the dividing line, and a radius of the imaginary circle is a preset value d (For example, 0.5 meter, 1 meter, or other value). For example, see FIG. 5.

Figure 5:
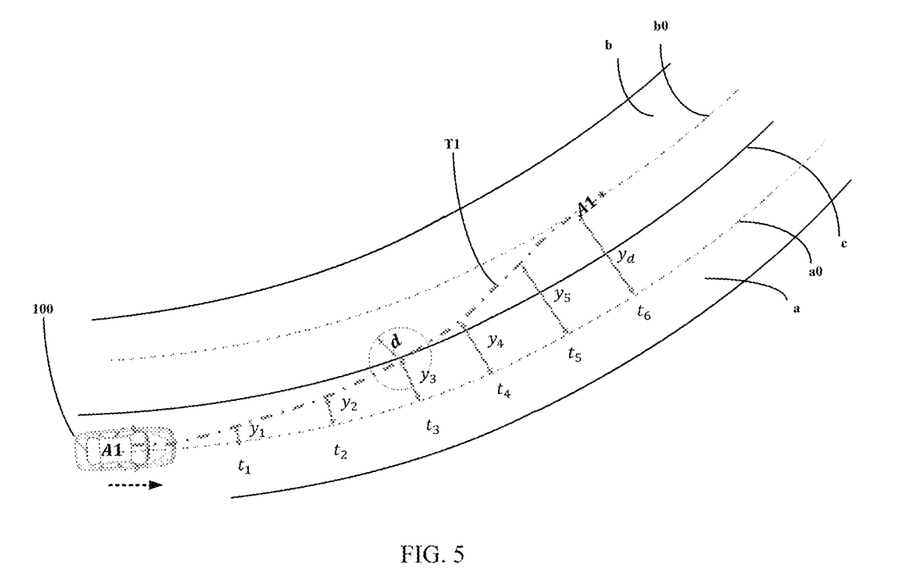
FIG. 5 illustrates a target location in an embodiment of the present disclosure.

In one embodiment, when coordinates of the vehicle 100 enter the target range, the detection module 302 can determine that the vehicle 100 is driving to the first target position.

In an embodiment, the first target object is another vehicle driving in the adjacent lane and behind or beside the vehicle 100. Specifically, the detection module 302 can use the detection device 34 to detect the another vehicle driving in the adjacent lane and behind or beside the vehicle 100. The detection module 302 also detects whether a distance between the another vehicle and the vehicle 100 is less than the preset distance.

In block S3, when the first target object is not detected within the preset distance, the execution module 301 controls the vehicle 100 to continue driving according to the first lane change path.

In block S4, when the first target object is detected within the preset distance, the execution module 301 controls the vehicle 100 to drive to a second target position in the lane where the vehicle 100 is currently driving. That is, the vehicle 100 no longer drives according to the first lane change path. Step S5 is executed after step S4 is executed.

In one embodiment, the second target position is a position where the vehicle 100 drives in the lane where the vehicle 100 is currently driving for a preset period (for example, 1 second, 5 seconds, 10 seconds, or other period).

Figure 6:
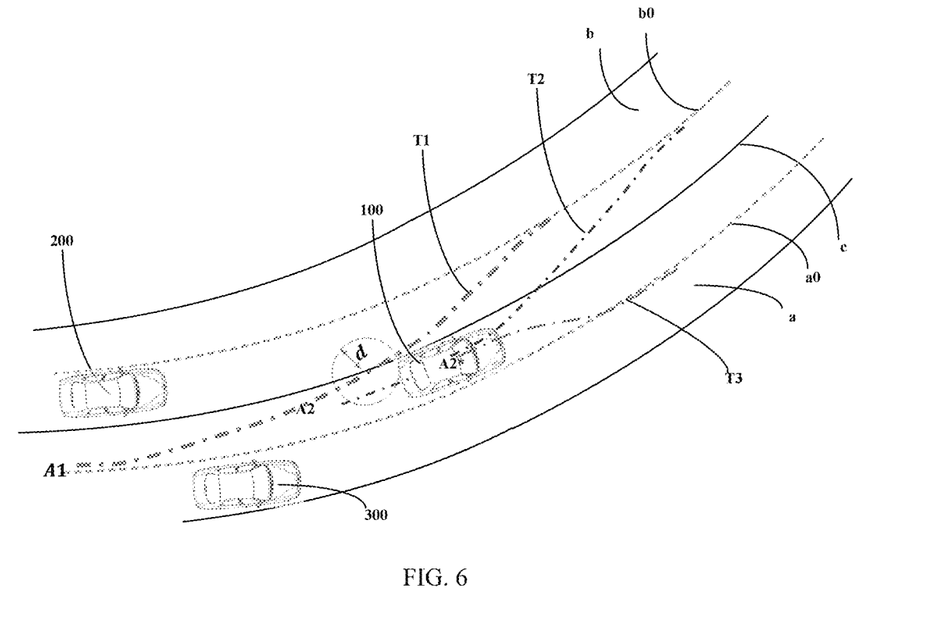
FIG. 6 illustrates a detection of another vehicle posing a risk to change lane when reaching the target location in an embodiment of the present disclosure.

For example, referring to FIG. 6, it is assumed that when the vehicle 100 drives to the first target position A2, the detection module 302 detects that the distance between the first target object 200 and the vehicle 100 is within the preset distance. The execution module 301 controls the vehicle 100 to drive in the lane where the vehicle 100 is currently driving for the preset period, for example, 10 seconds, to reach the second target position A2*.

In block Step S5, when the vehicle 100 reaches the second target position, the detection module 302 again detects the first target object. The detection module 302 detects whether the first target object is within the preset distance. When the first target object is not detected within the preset distance, step S51 is executed. When the first target object is detected within the preset distance, step S52 is executed.

Similarly, the detection module 302 can use the detection device 34 to detect the first target object.

In block S51, when the first target object is not detected within the preset distance, the execution module 301 plans a second lane change path based on the lane where the vehicle 100 is currently driving and the adjacent lane, and controls the vehicle 100 to drive according to the second lane change path.

It should be noted that the method for the execution module 301 to plan the second lane change path based on the lane where the vehicle 100 is currently driving and the adjacent lane is the same as the method for planning the first lane change path described above, and the method is not repeated here. For example, the execution module 301 plans a second lane change path T2 based on the lane where the vehicle 100 is currently driving and the adjacent lane.

In block S52, when the first target object is detected within the preset distance, the detection module 302 detects a second target object 300. When the second target object 300 is not detected within the preset distance, step S53 is executed. When the second target object 300 is detected within the preset distance, step S52 is continued.

In one embodiment, the second target object 300 is another vehicle driving in the lane where the vehicle 100 is currently driving and behind the vehicle 100.

Similarly, the detection module 302 can use the detection device 34 to detect the second target object 300.

In block S53, when the second target object 300 is not detected within the preset distance, the execution module 301 plans a third lane change path based on the second target position and the center line of the lane where the vehicle 100 is currently driving and controls the vehicle 100 to drive according to the third lane change path to make the vehicle 100 return to the center line of the lane where the vehicle 100 is currently driving.

In an embodiment, the execution module 301 may use the lane centering control (LCC) system to plan the third lane change path.

For example, referring to FIG. 6, the execution module 301 plans a third lane change path T3 based on the second target position A2* and the center line a0 of the lane where the vehicle 100 is currently driving, and controls the vehicle 100 to drive according to the third lane change path, so that the vehicle 100 can return to the center line a0 of the lane where the vehicle 100 is currently driving.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A lane change planning method, the method comprising:

planning a first lane change path based on a lane where a vehicle is currently driving and an adjacent lane;

controlling the vehicle to drive based on the first lane change path, and detecting a first target object when the vehicle drives to a first target position, wherein the first target position is determined by the first lane change path, a dividing line between the lane where the vehicle is currently driving and the adjacent lane, the first target position is any position within a target range, and the target range is a range of a predetermined circle, a center of the predetermined circle is a point of intersection of the first lane change path and the dividing line, and a radius of the predetermined circle is equal to a preset value d; and controlling the vehicle to drive according to the first lane change path, when the first target object is not detected within a preset distance.

2. The lane change planning method of claim 1, wherein a formula for calculating the first lane change path is as follows:

$$y_{TAP}(t) = \begin{cases} \frac{1}{6}J_{y,d}t^3 & T_0: 0 \le t \le t_1 \\ y_1 + v_1(t-t_1) + \frac{1}{2}a_{y,d}(t-t_1)^2 & T_2: t_1 < t \le t_2 \\ y_2 + v_2(t-t_2) + \frac{1}{2}a_{y,d}(t-t_2)^2 - \frac{1}{6}J_{y,d}(t-t_2)^3 & T_2: t_2 < t \le t_3 \\ y_3 + v_3(t-t_3) - \frac{1}{2}a_{y,d}(t-t_3)^2 + \frac{1}{6}J_{y,d}(t-t_3)^3 & T_3: t_3 < t \le t_4 \\ y_4 + v_4(t-t_4) - \frac{1}{2}a_{y,d}(t-t_4)^2 & T_4: t_4 < t < t_5 \\ y_d & T_6: t > t_6 \end{cases}$$

wherein, $v_i = v_{y,TAP}(T_i)$, $y_i = y_{TAP}(T_i)$, $i \in [0,6]$, Wherein, $a_{y,d}$ represents a lateral acceleration rate when changing lanes, $J_{y,d}$ represents a lateral jerking degree when changing lanes; $v_i$ represents a required driving lateral speed during a time period $T_i$; $y_i$ represents a lateral displacement required for the corresponding time period $T_i$; $y_d$ is a lateral displacement required to complete the lane change.

3. The lane change planning method of claim 1, wherein the first target object is another vehicle driving in the adjacent lane and behind or beside the vehicle.

4. The lane change planning method of claim 1, further comprising:
controlling the vehicle to drive to a second target position in the lane where the vehicle is currently driving, when the first target object is detected within the preset distance;
detecting the first target object, when the vehicle reaches the second target position; and
when the first target object is not detected within the preset distance from the second target position, planning a second lane change path based on the lane where the vehicle is currently driving and the adjacent lane, and controlling the vehicle to drive according to the second lane change path.

5. The lane change planning method of claim 4, further comprising:
detecting a second target object, when the first target object is detected within the preset distance from the second target position; and
when the second target object is not detected within the preset distance, planning a third lane change path based on the second target position and a center line of the lane where the vehicle is currently driving, and controlling the vehicle to drive according to the third lane change path.

6. The lane change planning method of claim 5, wherein the second target position is a position where the vehicle drives in the lane where the vehicle is currently driving for a preset period.

7. The lane change planning method of claim 5, wherein the second target object is another vehicle driving in the lane where the vehicle is currently driving and behind the vehicle.

8. The lane change planning method of claim 1, wherein the first lane change path is a function of a time and an acceleration rate, wherein the time is a period when the vehicle performs a lane change, and the acceleration rate is a lateral acceleration rate at which the vehicle performs the lane change.

9. The lane change planning method of claim 1, wherein the lane where the vehicle is currently driving, the adjacent lane, and the dividing line are obtained through a high-precision map.

10. A vehicle-mounted device comprising a memory and a processor, the memory stores at least one computer-readable instruction, and the processor executes the at least one computer-readable instruction to implement to a lane change planning method, the method comprising:
planning a first lane change path based on a lane where a vehicle is currently driving and an adjacent lane;
controlling the vehicle to drive based on the first lane change path, and detecting a first target object when the vehicle drives to a first target position, wherein the first target position is determined by the first lane change path, a dividing line between the lane where the vehicle is currently driving and the adjacent lane, the first target position is any position within a target range, and the target range is a range of a predetermined circle, a center of the predetermined circle is a point of intersection of the first lane change path and the dividing line, and a radius of the predetermined circle is equal to a preset value d;
controlling the vehicle to drive according to the first lane change path, when the first target object is not detected within a preset distance.

11. The vehicle-mounted device of claim 10, wherein a formula for calculating the first lane change path is as follows:

$$y_{TAP}(t) = \begin{cases} \frac{1}{6}J_{y,d}t^3 & T_0: 0 \le t \le t_1 \\ y_1 + v_1(t-t_1) + \frac{1}{2}a_{y,d}(t-t_1)^2 & T_2: t_1 < t \le t_2 \\ y_2 + v_2(t-t_2) + \frac{1}{2}a_{y,d}(t-t_2)^2 - \frac{1}{6}J_{y,d}(t-t_2)^3 & T_2: t_2 < t \le t_3 \\ y_3 + v_3(t-t_3) - \frac{1}{2}a_{y,d}(t-t_3)^2 + \frac{1}{6}J_{y,d}(t-t_3)^3 & T_3: t_3 < t \le t_4 \\ y_4 + v_4(t-t_4) - \frac{1}{2}a_{y,d}(t-t_4)^2 & T_4: t_4 < t < t_5 \\ y_d & T_6: t > t_6 \end{cases}$$

wherein, $v_i = v_{y,TAP}(T_i)$, $y_i = y_{TAP}(T_i)$, $i \in [0,6]$, Wherein, $a_{y,d}$ represents a lateral acceleration rate when changing lanes, $J_{y,d}$ represents a lateral jerking degree when changing lanes; $v_i$ represents a required driving lateral speed during a time period $T_i$; $y_i$ represents a lateral displacement required for the corresponding time period $T_i$; $y_d$ is a lateral displacement required to complete the lane change.

12. The vehicle-mounted device of claim 10, wherein the first target object is another vehicle driving in the adjacent lane and behind or beside the vehicle.

13. The vehicle-mounted device of claim 10, the method further comprising:
controlling the vehicle to drive to a second target position in the lane where the vehicle is currently driving, when the first target object is detected within the preset distance;
detecting the first target object again, when the vehicle reaches the second target position; and
when the first target object is not detected within the preset distance from the second target position, planning a second lane change path based on the lane where the vehicle is currently driving and the adjacent lane and controlling the vehicle to drive according to the second lane change path.

14. The vehicle-mounted device of claim 13, the method further comprising:
   detecting a second target object, when the first target object is detected within the preset distance from the second target position; and
   when the second target object is not detected within the preset distance, planning a third lane change path based on the second target position and a center line of the lane where the vehicle is currently driving and controlling the vehicle to drive according to the third lane change path.

15. The vehicle-mounted device of claim 14, wherein the second target position is a position where the vehicle drives in the lane where the vehicle is currently driving for a preset period.

16. The vehicle-mounted device of claim 14, wherein the second target object is another vehicle driving in the lane where the vehicle is currently driving and behind the vehicle.

17. The vehicle-mounted device of claim 10, wherein the first lane change path is a function of a time and an acceleration rate, wherein the time is a period when the vehicle performs a lane change, and the acceleration rate is a lateral acceleration rate at which the vehicle performs the lane change.

18. The vehicle-mounted device of claim 10, wherein the lane where the vehicle is currently driving, the adjacent lane, and the dividing line are obtained through a high-precision map.

* * * * *